Figure 2:
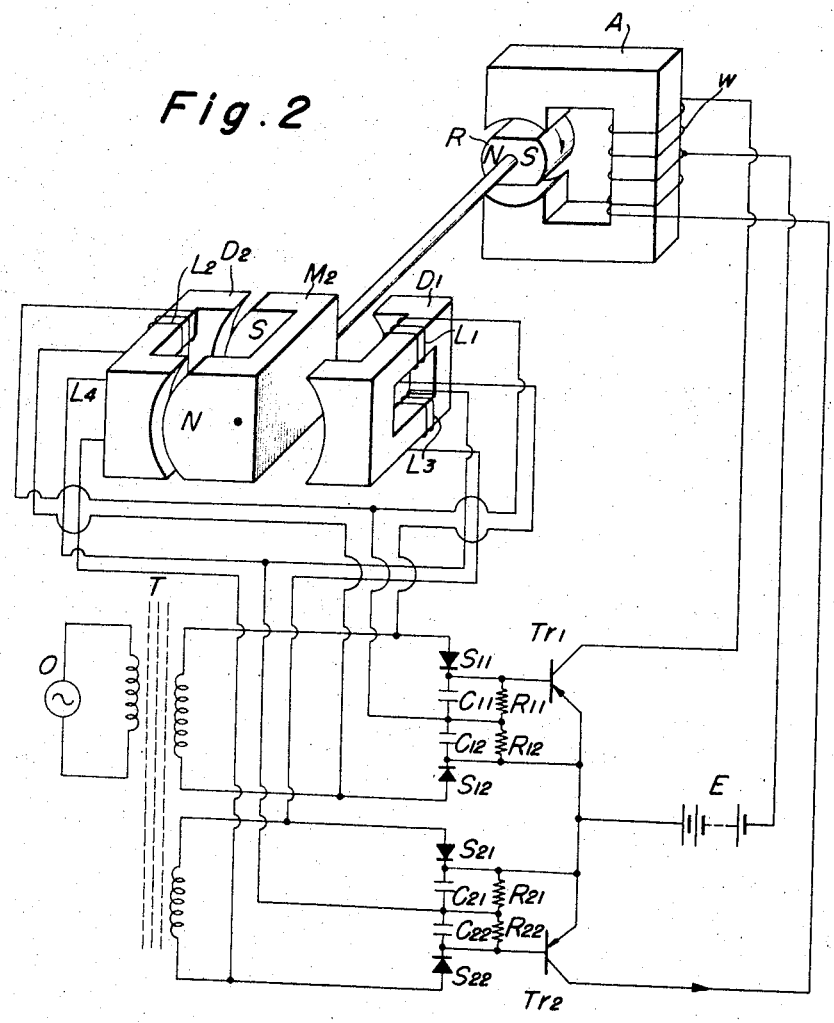

Oct. 10, 1967
MAKOTO NOUMI
3,346,792
BRUSHLESS MOTORS WHEREIN COMMUTATION IS CONTROLLED
BY AN IMPEDANCE RESPONSIVE TO ROTOR MOVEMENT
Filed June 15, 1964
2 Sheets-Sheet 1
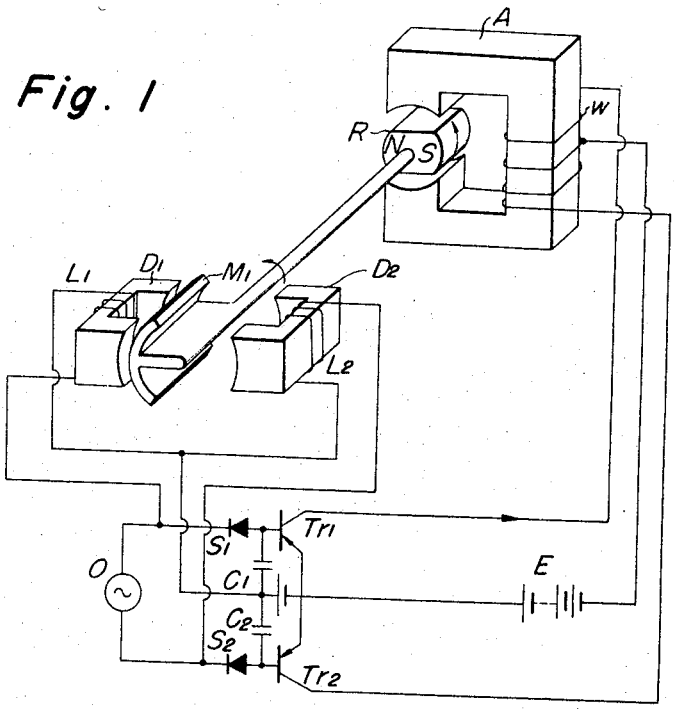
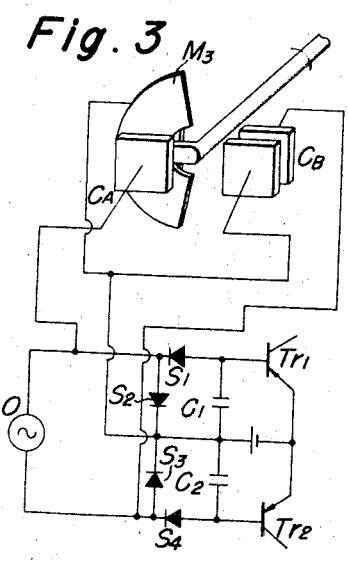
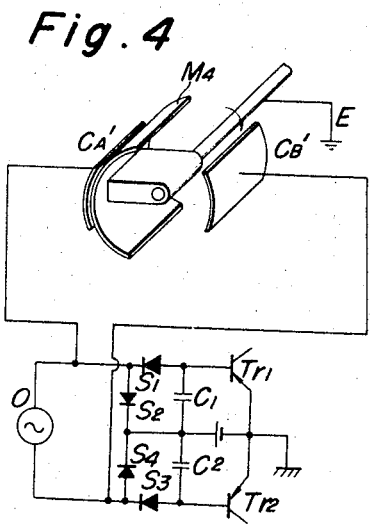
INVENTOR
MAKOTO NOUMI
BY Paul M. Craig Jr.
ATTORNEYS

United States Patent Office 3,346,792
Patented Oct. 10, 1967

3,346,792
BRUSHLESS MOTORS WHEREIN COMMUTATION IS CONTROLLED BY AN IMPEDANCE RESPONSIVE TO ROTOR MOVEMENT
Makoto Noumi, Yokohama, Japan, assignor to Hitachi, Ltd., Tokyo, Japan, a corporation of Japan
Filed June 15, 1964, Ser. No. 374,929
6 Claims. (Cl. 318—138)

The present invention relates to brushless motors in which an impedance change responsive to the rotation of the rotor is utilized to control the armature circuit.

Heretofore, several types of brushless motors have been proposed and known in the art. One type of such prior art brushless motor employs a system in which an electromotive force detected during the rotation of the rotor is utilized to actuate transistors for thereby controlling armature current, while another type employs a system which utilizes the action of holes or any other magnetism responsive elements. A fatal difficulty encountered with the brushless motor of the former type is its lack of a self-starting ability, while the latter type is defective in its extremely poor sensitivity and efficiency though it possesses a self-starting ability. A brushless motor capable of self-starting has recently been proposed, in whch a high-frequency signal is transmitted from its stator side to its rotor side by means of an electro-magnetic or electrostatic coupling and this signal is subsequently fed back to the stator side by means of an electromagnetic or electrostatic coupling to drive the rotor, thereby enabling the motor to be made self-starting. However, disadvantages involved in this type of brushless motor are that a great loss results from the necessity of providing at least one coupling circuit for the purpose of detecting the rotating position of the rotor and utilization of a relatively high-frequency signal, thereby minimizing such great loss results in an increased interference to other circuits.

Therefore, the primary object of the invention is to provide an improved brushless motor which is capable of self-starting without requiring any energy transmission means interposed between its stator and rotor.

According to the invention, there is provided a brushless motor comprising a rotor arranged for rotation in opposed relation to an armature, means responsive to a predetermined angular rotating position of said rotor to thereby cause a change in the value of reactance in an A.C. voltage applying circuit, and means responsive to the above change in the reactance to control the armature current.

According to the invention, there is also provided a brushless motor comprising a rotor arranged for rotation in opposed relation to an armature, one saturable core, a coil wound about each of said saturable cores, and provided in an A.C. voltage applying circuit, means including a permanent magnet responsive to an angular rotating position of said rotor for thereby alternately causing magnetic saturation of said cores, and means responsive to a change in the inductance of said coils due to the magnetic saturation to thereby control the armature current.

There are other objects and particularities of the invention which will become obvious from the following description with reference to the accompanying drawings, in which:

FIG. 1 is a schematic circuit diagram of a brushless motor embodying the present invention; and FIGS. 2–4 are views similar to FIG. 1, but showing various other embodiments of the invention.

Now referring to FIG. 1, there is shown an armature core A which has an armature coil W wound thereabout. A rotor R is disposed between opposite legs of the armature core A and has a member $M_1$ of magnetic material of substantially arcuate shape mounted on its shaft for coaxial rotation therewith. On opposite sides of the member $M_1$, there are disposed substantially U-shaped cores $D_1$ and $D_2$, on which coils $L_1$ and $L_2$ are provided, respectively. A high frequency oscillator O is provided to supply a minus rectified signal voltage to the base of respective control transistors $Tr_1$ and $Tr_2$ through respective rectifying diodes $S_1$ and $S_2$ and filter condensers $C_1$ and $C_2$.

When now the rotary member $M_1$ of magnetic material takes a position closely adjacent the core $D_1$ as shown in FIG. 1, the reluctance of a magnetic path for the coil $L_1$ decreases because the core $D_1$ is shorted by the magnetic member $M_1$. Therefore, the value of inductance of the coil $L_1$ is made to increase and voltage drop across the coil $L_1$ becomes remarkably greater than that across the coil $L_2$ having an open magnetic path. Thus, the transistor $Tr_1$ is driven to its on state and the transistor $Tr_2$ to its off state so that a current from a D.C. power supply E can flow through the armature coil W in a manner to rotate the rotor R in a direction as shown by arrow in FIG. 1. At a position of the rotor R in which it is rotated 180 degrees from the position shown in FIG. 1, the inductance of the coil $L_1$ is now decreased to drive the transistor $Tr_1$ to its off state and the transistor $Tr_2$ to its on state. Therefore, torque of the same direction with the above is imparted to the rotor R, which can thereby be continuously rotated in the same direction.

An arrangement shown in FIG. 2 is actually a modification of the arrangement shown in FIG. 1. In the arrangement of FIG. 2, cores $D_1'$ and $D_2'$ of substantially U-shaped saturable core have two parallelly disposed magnetic branch paths, and a permanent magnet $M_2$ coaxial with the rotor R is disposed between the cores $D_1'$ and $D_2'$. The permanent magnet $M_2$ has an ability of causing magnetic saturation of the cores $D_1'$ and $D_2'$. Coils $L_1$ and $L_3$ on the core $D_1'$ and coils $L_2$ and $L_4$ on the core $D_2'$ are wound in a manner that their magnetic lines of flux are intensified with each other. The coils $L_1$ and $L_2$, and the coils $L_3$ and $L_4$ are connected between the bases and the emitters of respective transistors $Tr_1$ and $Tr_2$ through respectively rectifying diodes $S_{11}$, $S_{12}$ and $S_{21}$, $S_{22}$. The control circuit of the brushless motor includes a high frequency oscillator O, a transformer T, filter condensers $C_{11}$, $C_{12}$, $C_{21}$ and $C_{22}$, resistors $R_{11}$, $R_{12}$, $R_{21}$ and $R_{22}$, and a D.C. power supply E.

When now the magnet $M_2$ takes a position closely adjacent the core $D_2'$, as shown in FIG. 2, the permeability of the magnetic paths for the coils $L_2$ and $L_4$ becomes remarkably small because of the magnetic saturation by the permanent magnet $M_2$. Therefore, values of inductance of the coils $L_2$ and $L_4$ are remarkably decreased and the voltage of the high frequency oscillator O is applied to the coils $L_1$ and $L_3$. Then, a positive potential appears at the base of the transistor $Tr_1$ by the voltage applied across the coil $L_1$ and a negative potential appears at the base of the transistor $Tr_2$ by the voltage applied across the coil $L_3$. Therefore, the transistor $Tr_1$ is driven to its off state and the transistor $Tr_2$ to its on state so that current from the D.C. power supply E can flow through the armature coil W to rotate the rotor R in a direction of arrow. At a position of the rotor R in which it is rotated 180 degrees from the previous position, the high frequency voltage is almost entirely applied to the coils $L_2$ and $L_4$ to thereby drive the transistor $Tr_1$ to its on state and the transistor $Tr_2$ to its off state. The rotor R therefore is supplied with the torque of the same direction with the above and continues its normal steady rotation in the same direction.

Description will next be made with regard to embodiments shown in FIGS. 3 and 4. The arrangements shown in FIGS. 3 and 4 are generally similar to that of FIG. 1, except that condensers are utilized in lieu of the cores $D_1$ and $D_2$ forming the means of detecting the rotating position of the rotor R. According to the arrangement shown in FIG. 3, condensers $C_A$ and $C_B$ each formed of a pair of electrode plates disposed opposite to each other are positioned in a manner to interpose therebetween a plate $M_3$ of dielectric substance coaxially connected with the rotor R. Permittivity of the condensers $C_A$ and $C_B$ varies alternately when the plate $M_3$ is rotated to successively pass between the opposed electrode plates thereof. Resultant drop in the high frequency voltage in the condensers $C_A$ and $C_B$ is utilized to control the transistors $Tr_1$ and $Tr_2$. In the arrangement shown in FIG. 4, an electrode plate $M_4$ adapted for coaxial rotation with the rotor R forms an opposite electrode which is common to both of opposed condensers $C_A'$ and $C_B'$. Therefore, it will be seen that the same effect with that obtained with the arrangement of FIG. 3 can be obtained by the arrangement of FIG. 4.

From the foregoing description, it will be apparent that the brushless motor according to the invention is provided with the self-starting ability and can operate at a high efficiency in spite of a compact structure since the inventive motor does not require any energy transmission means such as an electromagnetic or electrostatic coupling disposed between a stator part and a rotor part of prior devices for the purpose of detecting the rotating position of the rotor. Especially, the embodiment shown in FIG. 2 which utilizes the magnetic saturation effect has a remarkably high efficiency and excellent sensitivity because high frequency voltage can quite effectively be converted to a control voltage for a transistor to drive it to the off state with its base caused to have a positive potential.

What is claimed is:
1. A brushless motor comprising:
   (1) a permanent magnet rotor,
   (2) a stator,
   (3) an armature coil wound around said stator in a manner to provide current flow therethrough in alternate directions,
   (4) first and second amplifiers having their outputs applied to said armature coil for supplying current flow therethrough in alternate directions,
   (5) first and second reactance elements operatively coupled to said first and second amplifiers for controlling the operation of said amplifiers,
   (6) means for continuously applying a high frequency signal to both said reactance elements, and
   (7) means for alternately varying primarily only the impedance value of one of said reactance elements in accordance with rotation of said rotor to thereby turn on said first and second amplifiers which alternately excite said armature coil alternately with the outputs of said first and second amplifiers.

2. A brushless motor according to claim 1 wherein first and second rectifying circuit means are coupled across the first and second reactance means respectively, for rectifying the high frequency signal developed thereacross, the output of said first and second rectifying means being operatively coupled to and controlling operation of said first and second amplifiers, respectively.

3. A brushless motor according to claim 1 wherein said first and second amplifiers are transistor amplifiers having the emitter-collectors thereof connected to said armature coil, said first and second reactance elements comprise first and second inductance elements, and said means for varying the reactance values comprises a magnetically permeable member for varying the inductance values of said first and second inductance elements alternately in accordance with rotation of said rotor.

4. A brushless motor according to claim 3 wherein first and second rectifying circuit means are coupled across the first and second inductance elements, respectively, for rectifying the high frequency signal developed thereacross and deriving a turn-on signal, the outputs of said first and second rectifying circuit means being coupled across the base-emitters of said first and second transistor amplifiers, respectively.

5. A brushless motor according to claim 4, wherein said means for varying inductance of said inductance means comprises a pair of U-shaped magnetic cores, each provided with a coil wound therearound, and a member of magnetic material mounted to the shaft of said rotor, whereby the inductances of said coils are varied by saturating said U-shaped magnetic cores with said magnetic member in accordance with rotation of said rotor.

6. A brushless motor according to claim 5 wherein each of said U-shaped magnetic cores have first and second branch magnetic paths and the coil is separated into two parts each wound around a respective branch path for deriving high frequency signals of opposite polarity, said first and second rectifying means each including positive and negative polarity rectifying means for deriving both turn-on and turn-off signals for application to the first and second transistor amplifiers, respectively.

References Cited

UNITED STATES PATENTS

| 2,867,762 | 1/1959 | Lehman et al. | 318—254 |
| 3,091,728 | 5/1963 | Hogan et al. | 318—254 |
| 3,096,467 | 7/1963 | Angus et al. | 318—138 |
| 3,153,185 | 10/1964 | Hummel | 318—138 X |
| 3,175,140 | 3/1965 | Hogan et al. | 318—138 |
| 3,210,631 | 10/1965 | Niccolls | 318—138 |
| 3,214,663 | 10/1965 | Kreutzer | 318—138 |
| 3,242,405 | 3/1966 | Ikegami | 318—138 |

BENJAMIN DOBECK, *Primary Examiner.*

ORIS L. RADER, *Examiner.*

G. SIMMONS, *Assistant Examiner.*